US012251033B2

(12) United States Patent
Tanaka et al.

(10) Patent No.: US 12,251,033 B2
(45) Date of Patent: Mar. 18, 2025

(54) FOOD AND/OR BEVERAGE ITEM COUNTING DEVICE

(71) Applicant: Kura Sushi, Inc., Sakai (JP)

(72) Inventors: Kunihiko Tanaka, Sakai (JP); Naoyuki Sugiyama, Sakai (JP); Kazuma Tanaka, Sakai (JP)

(73) Assignee: KURA SUSHI, INC., Sakai (JP)

( * ) Notice: Subject to any disclaimer, the term of this patent is extended or adjusted under 35 U.S.C. 154(b) by 397 days.

(21) Appl. No.: 17/782,270

(22) PCT Filed: Dec. 4, 2020

(86) PCT No.: PCT/JP2020/045284
§ 371 (c)(1),
(2) Date: Jun. 3, 2022

(87) PCT Pub. No.: WO2021/112233
PCT Pub. Date: Jun. 10, 2021

(65) Prior Publication Data
US 2023/0009368 A1 Jan. 12, 2023

(30) Foreign Application Priority Data
Dec. 6, 2019 (JP) ................................ 2019-221072

(51) Int. Cl.
*G06V 20/68* (2022.01)
*A47F 10/06* (2006.01)
(Continued)

(52) U.S. Cl.
CPC ............. *A47F 10/06* (2013.01); *G06Q 20/18* (2013.01); *G06T 7/292* (2017.01); *G06V 20/68* (2022.01);
(Continued)

(58) Field of Classification Search
CPC .. G06V 20/00–95; G06Q 50/12; G06Q 20/18; A47F 10/06; G06T 2207/30242; A47G 23/08
See application file for complete search history.

(56) References Cited

U.S. PATENT DOCUMENTS

2002/0108506 A1 * 8/2002 Shimizu ............... A47F 10/06
99/325
2012/0325624 A1 12/2012 Tanaka
(Continued)

FOREIGN PATENT DOCUMENTS

CN 203220215 U 10/2013
CN 106859228 A 6/2017
(Continued)

OTHER PUBLICATIONS

International Search Report, issued in PCT/JP2020/045284, PCT/ISA/210, dated Feb. 2, 2021.
(Continued)

*Primary Examiner* — Sean T Motsinger
(74) *Attorney, Agent, or Firm* — Birch, Stewart, Kolasch & Birch, LLP

(57) ABSTRACT

The present invention provides a food and/or beverage item counting device to be provided in a food and/or beverage item provision system including a transport path that passes along a customer table to transport carriers each configured to allow a food and/or beverage item to be placed thereon, the food and/or beverage item counting device including: a first information acquiring unit disposed upstream of the table and configured to acquire information relating to each of the carriers on the transport path; a second information acquiring unit disposed downstream of the table and configured to acquire information relating to each of the carriers on the transport path; and a first calculating unit configured to calculate the number of the food and/or beverage items
(Continued)

taken out from the transport path to the table, wherein each of the carriers is provided with identification information for identifying the carrier.

12 Claims, 6 Drawing Sheets

(51) Int. Cl.
   *G06Q 20/18* (2012.01)
   *G06T 7/292* (2017.01)
   *G06Q 50/12* (2012.01)

(52) U.S. Cl.
   CPC .... *G06Q 50/12* (2013.01); *G06T 2207/30242* (2013.01)

(56) References Cited

U.S. PATENT DOCUMENTS

| | | | | |
|---|---|---|---|---|
| 2023/0009368 A1* | 1/2023 | Tanaka | ................... | A47G 23/12 |
| 2023/0237597 A1* | 7/2023 | Tanaka | ................... | G06Q 30/04 705/5 |

FOREIGN PATENT DOCUMENTS

| | | | |
|---|---|---|---|
| JP | 6-237846 A | | 8/1994 |
| JP | 7-262 A | | 1/1995 |
| JP | 11-46958 A | | 2/1999 |
| JP | 11-76032 A | | 3/1999 |
| JP | 2001-208601 A | | 8/2001 |
| JP | 2005-125052 A | | 5/2005 |
| JP | 2009-149437 A | | 7/2009 |
| JP | WO2012/077454 A1 | | 6/2012 |
| JP | 2017-23430 A | | 2/2017 |
| JP | 2017023430 A | * | 2/2017 |
| JP | 2019-103603 A | | 6/2019 |
| TW | 201528191 A | | 7/2015 |
| TW | I645817 B | | 1/2019 |
| TW | 201934055 A | | 9/2019 |

OTHER PUBLICATIONS

Written Opinion of the International Searching Authority, issued in PCT/JP2020/045284, PCT/ISA/237, dated Feb. 2, 2021.
Canadian Office Action and Search Report for Canadian Application No. 3,160,883, dated Mar. 5, 2024.
Chinese Office Action and Search Report for Chinese Application No. 202080080843.0, dated Nov. 8, 2023, with English translation.
Japanese Office Action for Japanese Application No. 2021-562749, dated Feb. 27, 2024, with English translation.
Taiwanese Office Action and Search Report for Taiwanese Application No. 109142803, dated Jan. 30, 2024, with English translation.

* cited by examiner (a)

| time | camera No | container No | open/close information |
|---|---|---|---|
| 18:10:10 | 1 | 8 | closed |
| 18:10:10 | 2 | 1 | closed |
| 18:10:11 | 1 | 9 | closed |
| 19:10:11 | 2 | 2 | closed |
| 18:10:12 | 1 | 10 | closed |
| 18:10:12 | 2 | 3 | closed |
| 18:10:13 | 1 | 11 | closed |
| 18:10:13 | 2 | 4 | closed |
| 18:10:14 | 1 | 12 | closed |
| 18:10:14 | 2 | 5 | closed |
| 18:10:15 | 1 | 13 | closed |
| 18:10:15 | 2 | 6 | closed |
| 18:10:16 | 1 | 14 | closed |
| 18:10:16 | 2 | 7 | closed |
| 18:10:17 | 1 | 15 | closed |
| 18:10:17 | 2 | 8 | open |
| 18:10:18 | 1 | 16 | closed |
| 18:10:18 | 2 | 9 | closed |
| 18:10:19 | 1 | 17 | closed |
| 18:10:19 | 2 | 10 | open |
| 18:10:20 | 1 | 18 | closed |
| 18:10:20 | 2 | 11 | closed |

FOOD AND/OR BEVERAGE ITEM COUNTING DEVICE

TECHNICAL FIELD

The present invention relates to a food and/or beverage item counting device to be provided in a food and/or beverage item provision system including a transport path that passes along a customer table to transport carriers each configured to allow a food and/or beverage item to be placed thereon.

BACKGROUND ART

In a food and/or beverage item provision system such as the one used in a conveyor belt sushi restaurant, the number of plates taken from the transport path by the customer is counted by a staff member of the restaurant at the time of check-out, and the amount of payment is calculated based on the counted number. However, manually counting the number of plates may cause a waiting time for the customer while the counting is performed, and may also result in a counting error due to human error.

Therefore, systems for automating such counting of the number of plates have been proposed. For example, in Patent Literature 1, on a transport path, cameras are disposed upstream and downstream, respectively, of a table at which the customer drinks and eats, and images of plates that are transported are captured with the cameras. Then, each plate whose image has been captured with the upstream camera is identified based on the color or the like, and if an image of the same plate is not captured with the downstream camera within a predetermined time, it is determined that the plate has been taken out from the transport path to the table, and the plate is counted. On the other hand, if an image of a plate whose image has been captured with the upstream camera is captured with the downstream camera within the predetermined time, it is determined that the plate has not been taken out from the transport path to the table. Thus, counting of the number of plates is automated.

CITATION LIST

Patent Literature

Patent Literature 1: JP 2019-103603A

SUMMARY OF INVENTION

Technical Problem

However, with the above-described system, an image of the same plate may not be captured with the downstream camera within the predetermined time when the transport speed of plates is slowed due to a malfunction of the transport path, for example. In this case, it is determined that a plate has been taken out from the transport path despite that the plate has not been taken out. Or, if a plate is temporarily taken out from the transport path, and thereafter the plate is put back to the transport path, an image of the same plate may not be captured with the downstream camera within the predetermined time. Therefore, the above-described system may not be able to accurately count the number of plates taken out from the transport path, or in other words, the amount of consumption of food and/or beverage items.

The present invention has been made in order to solve the above-described problem, and it is an object of the invention to provide a food and/or beverage item counting device capable of accurately counting the amount of consumption of food and/or beverage items even if an irregular situation such as the one described above has occurred.

Solution to Problem

The present invention provides a food and/or beverage item counting device to be provided in a food and/or beverage item provision system including a transport path that passes along a customer table to transport carriers each configured to allow a food and/or beverage item to be placed thereon, the food and/or beverage item counting device including: a first information acquiring unit disposed upstream of the table and configured to acquire information relating to each of the carriers on the transport path; a second information acquiring unit disposed downstream of the table and configured to acquire information relating to each of the carriers on the transport path; and a first calculating unit configured to calculate the number of the food and/or beverage items taken out from the transport path to the table, wherein each of the carriers is provided with identification information for identifying the carrier, each of the carriers is configured to assume a first state in which the food and/or beverage item is placed thereon, and a second state in which the food and/or beverage item is not placed thereon, the first calculating unit is configured to perform: a first determining step of determining, by the first information acquiring unit, which of the states each of the carriers is in; a second determining step of determining, by the second information acquiring unit, which of the states each of the carriers is in; a first storing step of storing the identification information of each of the carriers acquired by the first information acquiring unit and the state of the carrier in association with each other; a second storing step of storing the identification information of each of the carriers acquired by the second information acquiring unit and the state of the carrier in association with each other; and a counting step of, if it is determined by the first information acquiring unit that each of the carriers is in the first state, and it is determined by the second information acquiring unit that the carrier determined to be in the first state is in the second state, counting the food and/or beverage item carried on the carrier as being consumed at the table.

Note that the order of the first determining step and the second determining step, and the order of the first storing step and the second storing step are not particularly limited.

In the above-described food and/or beverage item counting system, the first information acquiring unit may include a first camera, and may be configured to: determine the state of each of the carriers based on image capture performed using the first camera; and acquire the identification information of the carrier using the first camera, and the second information acquiring unit may include a second camera, and may be configured to: determine the state of each of the carriers based on image capture performed using the second camera; and acquire the identification information of the carrier using the second camera.

The above-described food and/or beverage item counting system may further include a display unit provided at the table, wherein the display unit may be configured to display an amount of consumption of food and/or beverage items counted by the first calculating unit.

In the above-described food and/or beverage item counting system, each of the carriers may be configured to: carry a plate on which the food and/or beverage item is placed; and allow the plate on which the food and/or beverage item is placed to be taken out from the carrier by the customer, and the food and/or beverage item counting device may further include: a slot portion provided at the table and into which the plate taken out from each of the carriers is slotted; and, a second calculating unit configured to count the number of the plates slotted into the slot portion.

The above-described food and/or beverage item counting system may further include notifying means for, if the number of the food and/or beverage items counted by the first calculating unit and the number of the plates counted by the second calculating unit differ from each other, providing a notification to that effect.

The above-described food and/or beverage item counting system may further include check-out starting means for allowing the customer to provide an instruction to start check-out processing, wherein the first calculating unit may be configured to: when the instruction to start the check-out provided by the check-out starting means is received, read out the information stored in the first and second storing steps; and perform the counting step.

Advantageous Effects of Invention

With the food and/or beverage item counting device according to the present invention, it is possible to accurately count the amount of consumption of food and/or beverage items.

BRIEF DESCRIPTION OF DRAWINGS

FIG. 6 shows an example of a chronological list of container information.

DESCRIPTION OF EMBODIMENTS

1. Outline of Food and/or Beverage Item Provision System

Figure 1:
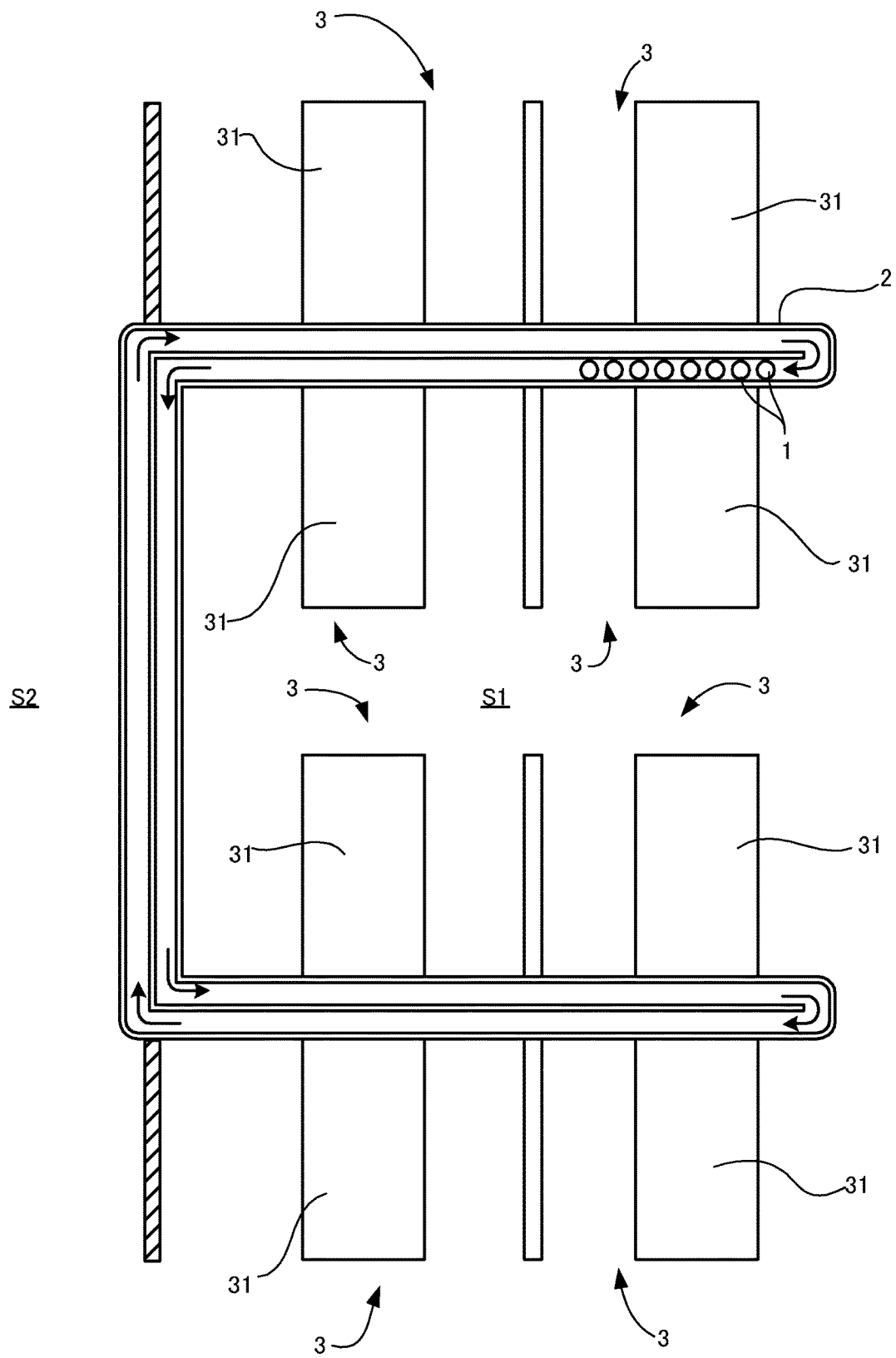
FIG. 1 is a plan view of a food and/or beverage item provision system according to an embodiment of the present invention.

An embodiment of a food and/or beverage item provision system in which a food and/or beverage item counting device according to the present invention is provided will be described below with reference to the drawings. FIG. 1 is a plan view of the food and/or beverage item provision system, and FIG. 2 is a cross-sectional view of a transport path.

As shown in FIG. 1, the food and/or beverage item provision system according to the present embodiment is installed, for example, in a sushi restaurant, and includes a transport path 2 on which containers 1 each containing a food or beverage item are transported between a customer section S1 and a kitchen section S2. The customer section S1 is provided with a plurality of seat booths 3 that are divided by partitions, and each of the seat booths 3 is disposed along the transport path 2. A rectangular table 31 is set in each of the seat booths 3 such that one side of the table 31 is in contact with the transport path 2.

A plate 11 (see FIG. 3) on which a food or beverage item (sushi, soup, sweets, a beverage, etc.) is placed is contained in each of the containers 1 transported via the transport path 2, and a customer seated in each of the seat booths 3 takes out, from the container 1 on the transport path 2, a plate 11 on which a food or beverage item is placed, and consumes the food or the beverage at the table 31.

Figure 2:
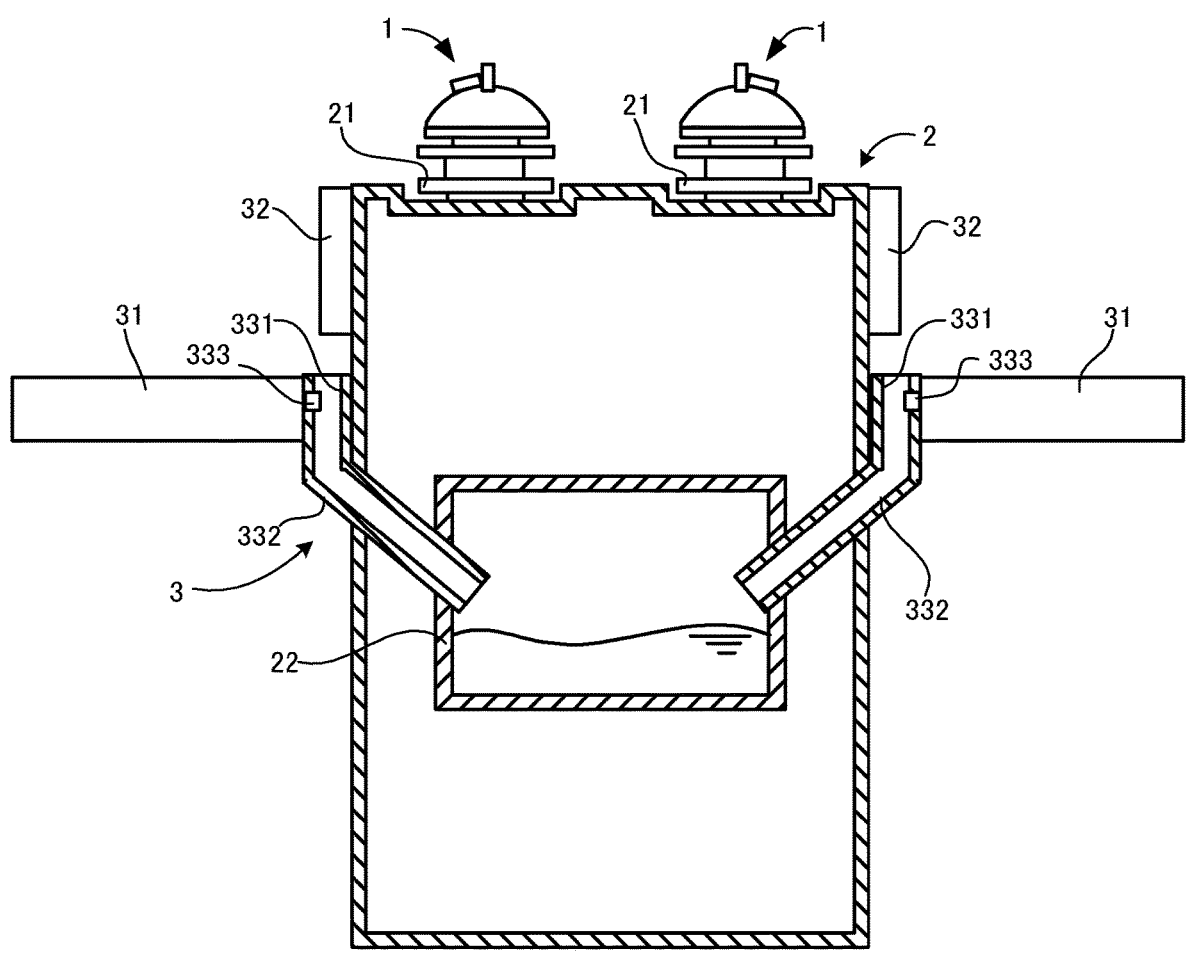
FIG. 2 is a cross-sectional view of a transport path.

As shown in FIG. 2, a touch panel display 32 for ordering, check-out, and so forth, and a slotting device 33 for slotting plates 11 are disposed on each table 31 in each seat booth 3. Additionally, the food and/or beverage item provision system is provided with a counting device for counting the amount of consumption of the food and/or beverage items consumed in the seat booths 3, and executing check-out processing. Each of these devices will be described in detail below.

1-1. Transport Path and Container

As shown in FIG. 2, a flat chain conveyor 21 is disposed on the transport path 2, and the flat chain conveyor 21 is configured to revolve around between the customer section S1 and the kitchen section S2, using a motor (not shown). The containers 1 described above are disposed at predetermined intervals on the flat chain conveyor 21, and travel on the transport path 2.

Figure 3:
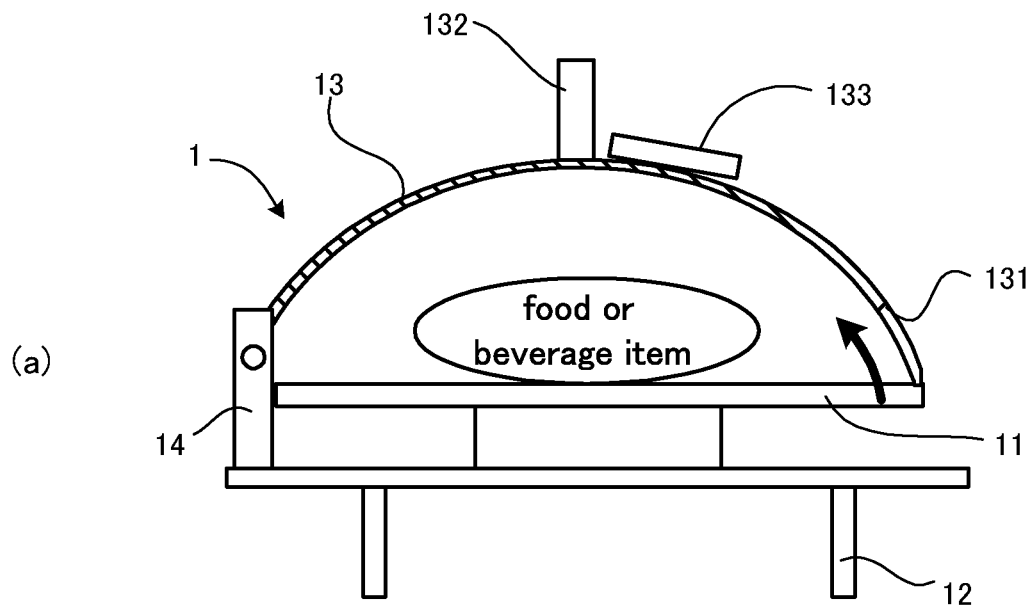
FIG. 3 shows cross-sectional views of a container.
Figure 3:
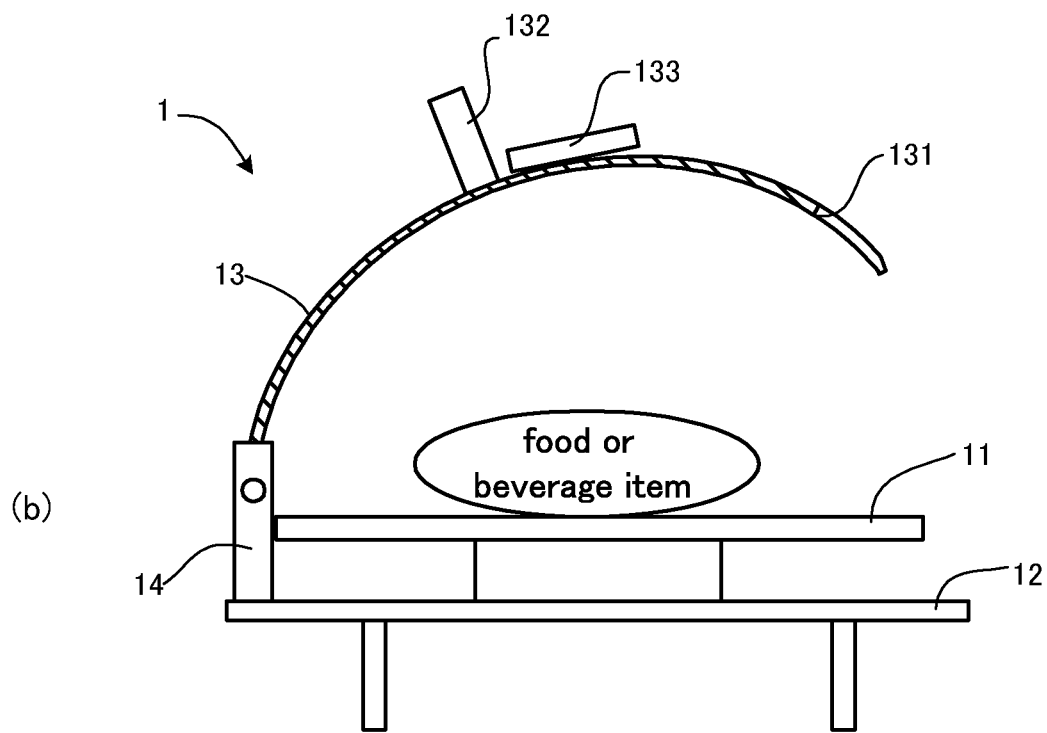

FIG. 3 shows side views of the container. As shown in FIG. 3, each of the containers 1 includes a placement part 12 to be placed on the flat chain conveyor 21, and a dome-shaped, transparent cover 13 configured to cover the placement part 12 and be openable/closable. A plate 11 on which a food or beverage item is placed thereon can be placed on the placement part 12. The cover 13 is swingably fixed to the placement part 12 via an opening/closing mechanism 14 including a hinge, and can assume a closed state (first state) in which the cover 13 covers the plate 11 placed on the placement part 12 as shown in FIG. 3(a), and an open state (second state) in which the plate 11 on which a food or beverage item is placed thereon can be taken out from the placement part 12 as shown in FIG. 3(b).

In the closed state, a lower edge of the cover 13 is in contact with a peripheral edge of the plate 11 placed on the placement part 12. Accordingly, the food or beverage item placed on the plate is covered by the cover, and is kept in a hygienic state so as to prevent dirt or the like from attaching thereto. In addition, an arc-shaped cut-out 131 is formed in a lower end portion of the cover 13 so as to face the seat booth 3 side, thus allowing an edge portion of the contained plate 11 to be gripped through the cut-out 131 when the cover 13 is in the closed state. When the customer pulls the plate 11 slightly upward after inserting his or her fingers from the cut-out 131 and gripping the edge portion of the plate 11, the plate 11 pushes the cover 13 upward, whereby the cover 13 flips up and opens via the opening/closing mechanism 14. This allows the customer to take out the plate 11 from the container 1 while gripping the plate 11 with his or her fingers.

Provided on an upper portion of the cover 13 are a display tag 132 indicating the kind of the food or beverage item contained in the cover 13, and an identifier 133 in which identification information for identifying the container 1 is embedded. For example, the kind of sushi such as tuna or sea bream may be displayed on the display tag 132. The identifier 133 may be, but is not particularly limited to, for example, an identifier that is readable with a camera, such as a bar code and a QR code (registered trademark).

1-2. Counting Device

Figure 4:
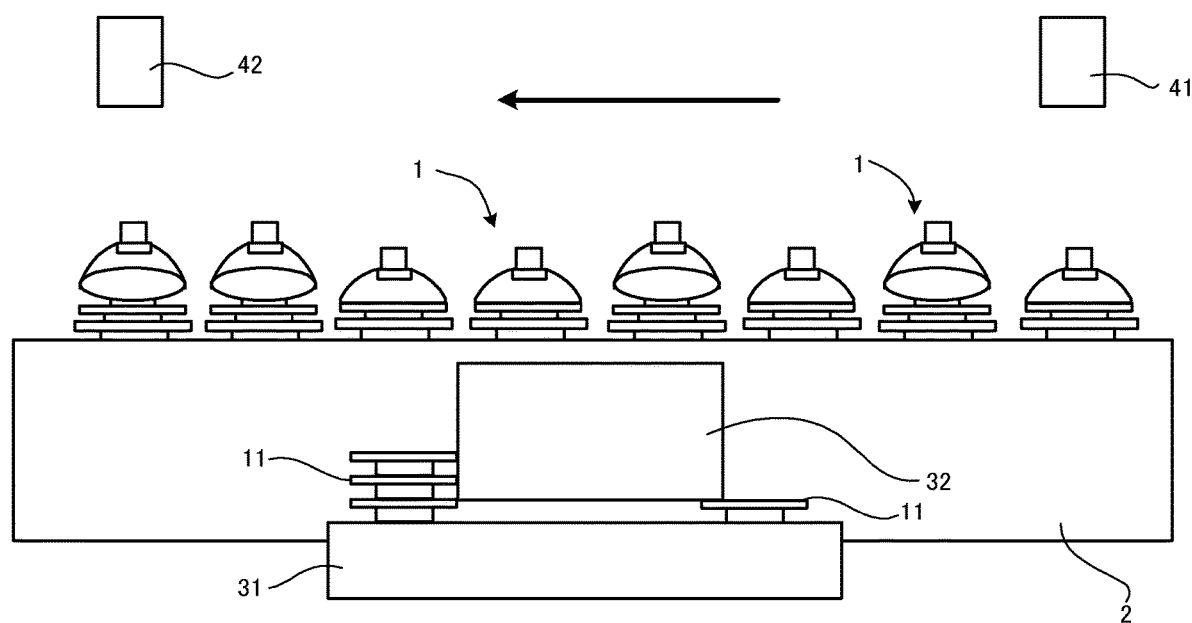
FIG. 4 is a side view of the transport path.
Figure 5:
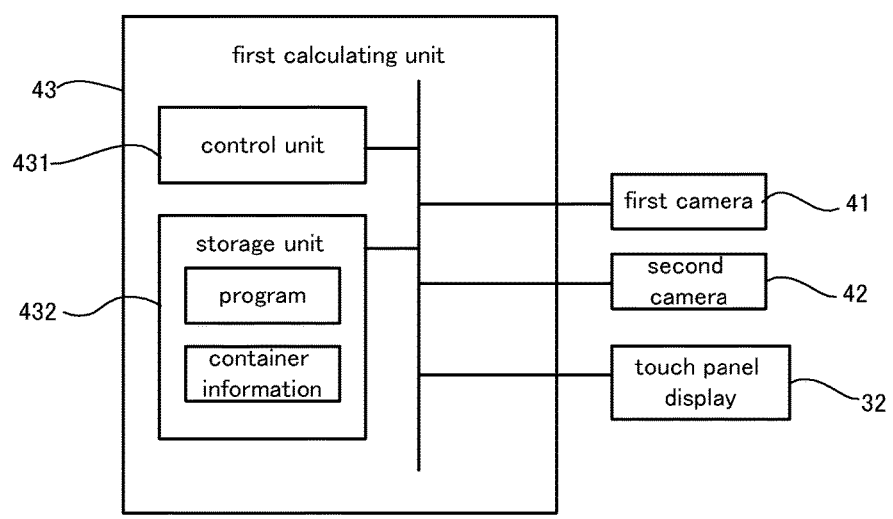
FIG. 5 is a block diagram of a first calculating unit.

Next, the counting device will be described. FIG. 4 is a side view of the transport path, and FIG. 5 is a block diagram of a first calculating unit. As shown in FIG. 4, the counting device includes a first camera 41 disposed upstream of the table 31 in each of the seat booths 3, a second camera 42 disposed downstream of the table 31, and a first calculating unit 43 that counts the number of plates taken out from the transport path 2. A first camera 41 and a second camera 42 are installed in each of the seat booths 3.

The first camera 41 sequentially captures images of the containers 1 passing by on the transport path 2, thus acquiring captured images of the containers 1. Similarly, the second camera 42 also sequentially captures images of the containers 1 passing by on the transport path 2, thus acquiring captured images of the containers 1. Accordingly, the image of each container 1 passing by on the transport path 2 is captured twice with the first camera 41 and the second camera 42, respectively, while the container 1 performs one revolution on the transport path 2.

Next, the first calculating unit 43 will be described. As shown in FIG. 5, the first calculating unit 43 is a computer to which a control unit 431 and a storage unit 432 are electrically connected. Also, the first camera 41, the second camera 42, and the touch panel display 32 described above are electrically connected to the first calculating unit 43, and captured images captured with the cameras 41 and 42 are processed by the control unit 431.

The control unit 431 includes a CPU (Central Processing Unit), a RAM (Random Access Memory), a ROM (Read Only Memory), and so forth, and performs processing such as counting of the plates taken out from the container 1. The storage unit 432 is, for example, an auxiliary storage device such as a hard disk drive and a solid state drive, and stores a program executed by the control unit 431, information on the container 1, and so forth.

The program is a program for performing various types of processing such as check-out processing including determination of the state of the container 1, recognition of the identifier 133, storage of various types of information, and counting of the plates. The processing performed using the program will be described later.

1-3. Slotting Device

Next, the slotting device 33 will be described. As shown in FIG. 2, the slotting device 33 includes a guide path 332 having a slot 331 that is open on the table 31 and into which plates are slotted, a sensor 333 that is provided inside the guide path 332 and detects plates 11 that have passed through the guide path 332, and a second calculating unit (not shown) that counts the number of plates 11 that have passed through the guide path 332. The guide path 332 extends obliquely downward toward the transport path 2, and is connected to a plate collecting channel 22 provided inside the transport path 2. The plate collecting channel 22 extends to the kitchen section S2, and is connected to a vessel (not shown) provided in the kitchen section S2. Also, water flows through the plate collecting channel 22 toward the vessel. When a plate 11 slotted from the slot 331 drops down into the plate collecting channel 22 via the guide path 332, the plate 11 is carried to the vessel by water. The plate 11 is then collected in the vessel, and is reused after being washed.

When plates 11 that have passed through the guide path 332 are detected by the sensor 333, the plates are sequentially counted by the second calculating unit, and are stored as the number of consumed plates. The second calculating unit is constituted by a computer similar to the computer constituting the first calculating unit 43.

A display prompting the customer to slot, into the slot 331, a plate 11 from which a food or beverage item has been consumed can be displayed on the touch panel display 32 and the seat booth 3.

2. Check-Out Processing

Figure 7:
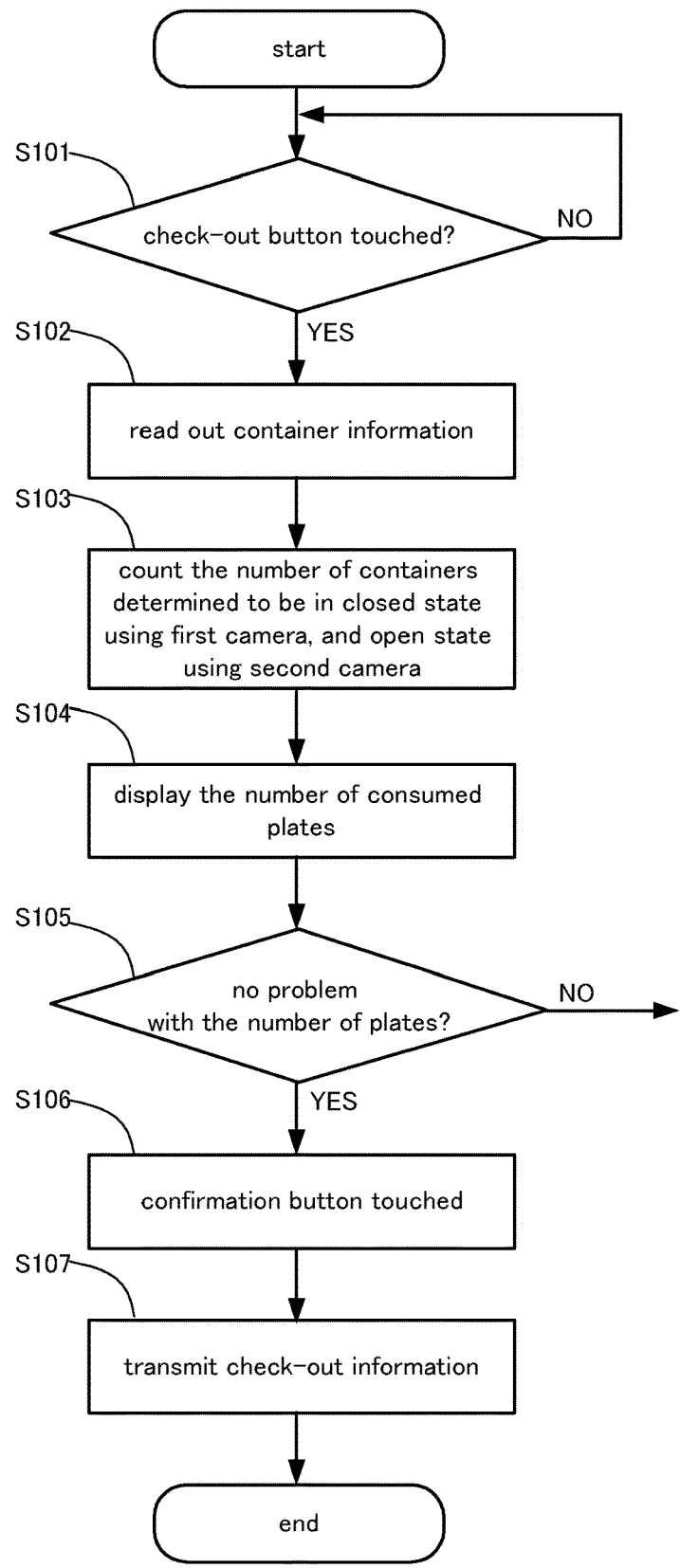
FIG. 7 is a flowchart of check-out processing.

Next, check-out processing performed in the food and/or beverage item provision system configured as described above will be described with reference to FIGS. 6 and 7. FIG. 6 shows an example of a chronological list of container information, and FIG. 7 is a flowchart of the check-out processing. When a customer is guided to a seat booth 3, the time at which the customer is guided is stored in the storage unit 432 of the first calculating unit 43. The time at which the customer is guided may be input by a staff member of the restaurant, or the time at which the operation of the touch panel display 32 is started may be stored. The time at which the customer is guided may be stored in the first calculating unit 43 by various other means.

Then, the customer takes out a plate 11 on which a food or beverage item is placed from a container 1 transported on the transport path 2, and consumes the food or beverage item at the table 31. The plate 11 from which the food or beverage item has been consumed is slotted via the slot 331 by the customer.

A check-out button (check-out starting means) for starting check-out is displayed on the touch panel display 32. When the check-out button is touched (step S101), the control unit 431 of the first calculating unit 43 starts check-out. That is, the above-described program is executed by the control unit 431. The details of the processing are as follows.

First, prior to the check-out processing, the control unit 431 determines, from the captured images acquired with the cameras 41 and 42, which of the open state and the closed state the cover 13 of the container 1 is in, using a known image recognition technique (first and second determining steps). The result of this determination is referred to as open/close information. In addition, the control unit 431 acquires, from the identifier 133 captured in the captured image, the identification information of each container 1. The thus acquired open/close information, identification information, time at which image capture was performed, and information relating to the camera with which image capture was performed are associated with each other, and are sequentially stored in the storage unit 432 as the container information. That is, a chronological list of the container information as shown in FIG. 6 is stored in the storage unit 432 (first and second storing steps). In order to improve the accuracy of the open/close information of the container 1, image capture may be performed a plurality of number of times (e.g., an odd number of times, such as five times or so) when the container 1 passes below the cameras 41 and 42, thus acquiring a plurality of captured images. Then, whether each of the captured images is in the open state or the closed state is determined using an image recognition technique. Then, one of the open state or the closed state in which the container 1 has been determined to be for a larger number of times may be used as the open/close information. The timing at which the open/closed state determination is performed is not particularly limited. The captured images may be stored in the storage unit 432, and thereafter the determination may be performed at a predetermined timing before check-out.

Then, when the check-out button is touched as described above, the control unit 431 reads out the necessary container information from the storage unit 432 (step S102). That is, between the time at which a customer is guided to a seat booth 3 and the time at which the check-out button is touched, the control unit 431 reads out the container information acquired with the cameras 41 and 42 in the seat booth 3. Which of the seat booths 3 in which the check-out is performed can be determined since the cameras 41 and 42 with which image capture has been performed and the touch panel display 32 of the corresponding seat booth 3 are associated with each other.

The control unit 431 counts, from among the containers 1 that have passed by the seat booth 3, the number of containers 1 that have been determined to be in the closed state using the first camera 41, and have been determined to be in the open state using the second camera 42 (step S103: counting step). That is, if the same container 1 is in the closed state on the upstream side of the seat booth 3 and in the open state on the downstream side thereof, this means that the cover 13 has been opened and the plate 11 has been taken out while the container 1 passes by the seat booth 3. For example, in the example shown in FIG. 6, the No. 8 container 1 whose image has been captured with the first camera 41 (camera No. 1) is in the closed state, and the No. 8 container 1 whose image has been captured with the second camera 42 (camera No. 2) is in the open state. Accordingly, it is determined that the plate 11 has been taken out from the No. 8 container 1. Also, in this case, it is determined that the plate 11 has been taken out from the No. 10 container 1 in the same manner. Accordingly, the number of containers 1 for which such a state has been detected is determined as the number of plates 11 that have been taken out, or in other words, the amount of consumption of food and/or beverage items.

When counting of the number of plates 11 that have been taken out is completed in this manner, the control unit 431 displays the counted number on the touch panel display 32 (step S104). In addition, a confirmation button is displayed on the touch panel display 32. If the customer accepts the number of consumed plates (YES in step S105), a description prompting the customer to touch the confirmation button is displayed. Then, if the customer touches the confirmation button (step S106), the check-out processing is performed by the control unit 431. That is, the amount of payment according to the counted number of plates is calculated, and is transmitted to a point of sale (POS) register (not shown) (step S107). Upon completion of the transmission, a screen indicating completion of check-out is displayed on the touch panel display 32. Thereafter, the customer goes toward the POS resister, and makes a payment there.

If the customer cannot accept the counted number of plates 11 (NO in step S105), the customer may call a staff member for confirmation or the like. For this purpose, a button for calling a staff member is displayed on the touch panel display 32.

When the above-described check-out button is touched, the number of plates stored in the second calculating unit and the number of plates counted by the first calculating unit 43 are compared. If there is any difference, a notification is provided to a staff member of the restaurant. The means for the notification is not particularly limited, and information to that effect may be transmitted to a portable terminal or the like carried by any of the staff members of the restaurant. Alternatively, the information may be transmitted to a central management system of the restaurant, and subsequently a notification is provided, for example, verbally to any of the staff members.

3. Features

The food and/or beverage item provision system configured in the above-described manner can provide the following effects.

(1) In the above embodiment, images of all of the containers 1 transported on the transport path 2 are captured with the first camera 41 and the second camera 42. Then, if the same container 1 is in the closed state on the upstream side of the seat booth 3, and is in the open state on the downstream side thereof, it is determined that the food and/or beverage item has been consumed, and the plate is counted. Accordingly, even if an image of the same container 1 is not captured with the second camera 42 within a predetermined period from when an image of that container 1 has been captured with the first camera 41, whether or not the food and/or beverage item has been consumed can be determined as long as image capture for the same container 1 is performed using the two cameras 41 and 42. Therefore, even in a circumstance where, for some reasons, the container 1 does not pass between the first camera 41 and the second camera 42 within a predetermined time, the number of plates 11 from which food and/or beverage items have been consumed can be reliably detected. That is, the counting device according to the present embodiment can reliably detect the number of plates 11 from which food and/or beverage items have been consumed, regardless of the time the container 1 takes to pass between the first camera 41 and the second camera 42.

As such, it is possible to automatically calculate the number of plates 11 from which food and/or beverage items have been consumed, and it is thus possible to reduce the time required for check-out, human errors, and the labor of staff members. As a result, it is possible to increase the customer satisfaction, and reduce costs.

(2) The number of consumed plates 11 is counted not only in the first calculating unit 43, but also in the second calculating unit. Accordingly, even if there is a counting error in the first calculating unit 43, the counting error in the first calculating unit 43 can be detected as long as all of the plates 11 from which food and/or beverage items have been consumed are slotted into the slot 331.

4. Modifications

Although an embodiment of the present invention has been described above, the present invention is not limited thereto, and various modifications may be made to the invention without departing from the spirit or essential characteristics thereof. It should be appreciated that the following modifications may be combined as appropriate.

(1) In the above embodiment, a case is described where a food or beverage item is consumed by taking the plate 11 out from the container 1 transported on the transport path 2; however, the desired food and/or beverage item may be ordered via the touch panel display 32. The order is then transmitted to the kitchen section S2, and is prepared. In this case, a container 1 in which the ordered food and/or beverage item is contained is transported on the transport path 2, and the container 1 may be provided with an indication such as the number of the seat booth 3 so as to indicate that the ordered food and/or beverage item is contained in the container 1. Alternatively, a screen for providing an advance notice indicating that the container 1 in which the ordered food and/or beverage item is contained will soon be transported may be displayed on the touch panel display 32. In this case as well, the plate 11 is taken out from the container 1, and thus the plate 11 can be counted in the same manner as describe above.

Alternatively, a dedicated transport path for transporting the container 1 in which the ordered food and/or beverage item is contained may be provided, and the container 1 may be transported using this transport path. In this case, the number of plates ordered from the touch panel display 32 may be separately counted in the first calculating unit 43. When the check-out button is touched, a total of this number and the number of plates 11 counted in the above-described manner may be displayed on the touch panel display 32.

(2) The configuration of the container 1 is not particularly limited, as long as the container 1 can carry the plate 11, and the state in which the plate 11 is placed thereon and the state in which the plate 11 has been taken out therefrom can be determined from captured images. Accordingly, the cover 13 is not necessarily needed, and the identifier 133 need only be disposed at any position of the container 1.

(3) The above-described various types of processing may be controlled by one or more computers. Accordingly, for example, the first calculating unit 43, the second calculating unit, and a module that performs processing for receiving orders can be constituted by the same computer. Although the first calculating unit also performs check-out processing other than counting of plates, check-out processing other than counting of the plates 11 may be performed by a module or a computer different from the first calculating unit 43. For example, several types of processing such as control of the cameras 41 and 42, image recognition of the open/closed state of the container 1, and control of the touch panel display 32 can be performed by different computers. Although the above-described various types of processing are implemented by a computer including a general-purpose CPU, part or all of the processing may be implemented by one or more dedicated processors.

(4) Although the open/close information of the container 1 and the identification information of the container 1 are acquired with cameras 41 and 42 in the above embodiment, the present invention is not limited thereto. That is, these pieces of information can also be acquired with various means (the first information acquiring unit, the second information acquiring unit) including, for example, various sensors other than the cameras 41 and 42, and communication means such as IC tags. The open/close information and the identification information may be acquired by different information acquiring units.

(5) It is possible to place a robot on the transport path 2, and cause the robot to talk to customers or perform some operations. For example, when the robot passes by the table of a customer that has taken a plate of tuna, the robot is caused to speak to surprise the customer by saying, for example, "Was today's tuna good?", thus providing increased amusement.

(6) Information relating to the type of the food and/or beverage item contained in each container 1 may be embedded in the identifier. This makes it possible to recognize the types and the number of food and/or beverage items located on the transport path 2 from images of the identifiers captured with the cameras 41 and 42. Accordingly, the food and/or beverage items to be supplied to the transport path 2 can be easily adjusted. It is also possible to keep track of the types and the number of food and/or beverage items taken out from the transport path 2 at each table 31.

It is also possible to use the information relating to the food and/or beverage items acquired by each customer and a customer management system in conjunction with each other. For example, a registered account of each customer and the information acquired by the first calculating unit 43 can be associated with each other, thus providing a benefit to the account of the customer according to the types and the number of food and/or beverage items acquired at each table 31.

(7) In the above embodiment, the amount of consumption (e.g., the number of plates 11) of food and/or beverage items that has been calculated by the first calculating unit 43 is displayed on the touch panel display 32 for check-out, and the number of plates that has been calculated by the second calculating unit is used in an auxiliary manner. However, the relationship between these numbers may be reversed. That is, displaying the number of plates that has been calculated by the second calculating unit on touch panel display 32 for check-out can be performed as main processing, and the number of plates calculated by the first calculating unit 43 can be used in an auxiliary manner. Accordingly, if there is a difference between the number of plates calculated by the second calculating unit and the number of plates calculated by the first calculating unit, a staff member of the restaurant can perform a checking operation.

(8) In the above embodiment, the food and/or beverage item provision system according to the present invention is applied to a sushi provision system; however the food and/or beverage item provision system may provide other food and/or beverage items. The configuration of the transport path and the configuration of the seat booth described above are merely examples, and can be modified as appropriate. The slotting device is not essential, and only the counting device may be provided as a device for counting the number of plates.

REFERENCE SIGNS LIST

1 Container (carrier)
2 Transport path
31 Table
32 Touch panel display (display unit)
331 Slot (slot portion)
41 First camera
42 Second camera
43 First calculating unit

The invention claimed is:

1. A food and/or beverage item counting device to be provided in a food and/or beverage item provision system including a transport path that passes along a customer table to transport carriers each configured to allow a food and/or beverage item to be placed thereon, the food and/or beverage item counting device comprising:
   a first information acquiring unit disposed upstream of the table and configured to acquire information relating to each of the carriers on the transport path;
   a second information acquiring unit disposed downstream of the table and configured to acquire information relating to each of the carriers on the transport path; and
   a first calculating unit configured to calculate the number of the food and/or beverage items taken out from the transport path to the table,
   wherein each of the carriers is provided with identification information for identifying the carrier,
   each of the carriers is configured to assume a first state in which the food and/or beverage item is placed thereon, and a second state in which the food and/or beverage item is not placed thereon,
   the first calculating unit is configured to perform:
   a first determining step of determining, by the first information acquiring unit, which of the states each of the carriers is in;
   a second determining step of determining, by the second information acquiring unit, which of the states each of the carriers is in;
   a first storing step of storing the identification information of each of the carriers acquired by the first information acquiring unit and the state of the carrier in association with each other;

a second storing step of storing the identification information of each of the carriers acquired by the second information acquiring unit and the state of the carrier in association with each other; and a counting step of, if it is determined by the first information acquiring unit that each of the carriers is in the first state, and it is determined by the second information acquiring unit that the carrier determined to be in the first state is in the second state, counting the food and/or beverage item carried on the carrier as being consumed at the table.

2. The food and/or beverage item counting device according to claim 1, wherein the first information acquiring unit includes a first camera, and is configured to: determine the state of each of the carriers based on image capture performed using the first camera; and acquire the identification information of the carrier using the first camera, and the second information acquiring unit includes a second camera, and is configured to: determine the state of each of the carriers based on image capture performed using the second camera; and acquire the identification information of the carrier using the second camera.

3. A food and/or beverage item counting device according to claim 1, further comprising a display unit provided at the table, wherein the display unit is configured to display an amount of consumption of food and/or beverage items counted by the first calculating unit.

4. The food and/or beverage item counting device according to claim 1, wherein each of the carriers is configured to:

carry a plate on which the food and/or beverage item is placed; and allow the plate on which the food and/or beverage item is placed to be taken out from the carrier by the customer, and the food and/or beverage item counting device further comprises:

a slot portion provided at the table and into which the plate taken out from each of the carriers is slotted; and, a second calculating unit configured to count the number of the plates slotted into the slot portion.

5. The food and/or beverage item counting device according to claim 4, further comprising notifying means for, if the number of the food and/or beverage items counted by the first calculating unit and the number of the plates counted by the second calculating unit differ from each other, providing a notification to that effect.

6. The food and/or beverage item counting device according to claim 1, further comprising check-out starting means for allowing the customer to provide an instruction to start check-out processing, wherein the first calculating unit is configured to: when the instruction to start the check-out provided by the check-out starting means is received, read out the information stored in the first and second storing steps; and perform the counting step.

7. A food and/or beverage item counting device to be provided in a food and/or beverage item provision system including a transport path that passes along a customer table to transport carriers each configured to allow a food and/or beverage item to be placed thereon, the food and/or beverage item counting device comprising:

a first camera disposed upstream of the table and configured to acquire information relating to each of the carriers on the transport path;

a second camera disposed downstream of the table and configured to acquire information relating to each of the carriers on the transport path;

at least one processor; and at least one memory storing computer program code, wherein each of the carriers is provided with identification information for identifying the carrier, each of the carriers is configured to assume a first state in which the food and/or beverage item is placed thereon, and a second state in which the food and/or beverage item is not placed thereon, the computer program code, when executed by the at least one processor, causes the at least one processor to calculate the number of the food and/or beverage items taken out from the transport path to the table, the computer program code further causes the at least one processor to perform:

a first determining step of determining, by the first camera, which of the states each of the carriers is in;

a second determining step of determining, by the second camera, which of the states each of the carriers is in;

a first storing step of storing the identification information of each of the carriers acquired by the first camera and the state of the carrier in association with each other;

a second storing step of storing the identification information of each of the carriers acquired by the second camera and the state of the carrier in association with each other; and a counting step of, if it is determined by the first camera that each of the carriers is in the first state, and it is determined by the second camera that the carrier determined to be in the first state is in the second state, counting the food and/or beverage item carried on the carrier as being consumed at the table.

8. The food and/or beverage item counting device according to claim 7, wherein the first camera is configured to:

determine the state of each of the carriers based on image capture performed using the first camera; and acquire the identification information of the carrier using the first camera, and the second camera is configured to:

determine the state of each of the carriers based on image capture performed using the second camera; and acquire the identification information of the carrier using the second camera.

9. The food and/or beverage item counting device according to claim 7, further comprising a display unit provided at the table, wherein the display unit is configured to display an amount of consumption of food and/or beverage items that are counted.

10. The food and/or beverage item counting device according to claim 7, wherein each of the carriers is configured to:

carry a plate on which the food and/or beverage item is placed; and allow the plate on which the food and/or beverage item is placed to be taken out from the carrier by the customer, the food and/or beverage item counting device further comprises a slot portion provided at the table and into which the plate taken out from each of the carriers is slotted, and the computer program code further causes the at least one processor to count the number of the plates slotted into the slot portion.

11. The food and/or beverage item counting device according to claim 10, further comprising notifying means for, if the counted number of the food and/or beverage items and the counted number of the plates differ from each other, providing a notification to that effect.

12. The food and/or beverage item counting device according to claim 7, further comprising check-out starting means for allowing the customer to provide an instruction to start check-out processing, wherein when the instruction to start the check-out provided by the check-out starting means is received, the computer program code further causes the at least one processor to:

read out the information stored in the first and second storing steps; and perform the counting step.

* * * * *